Figure 1:
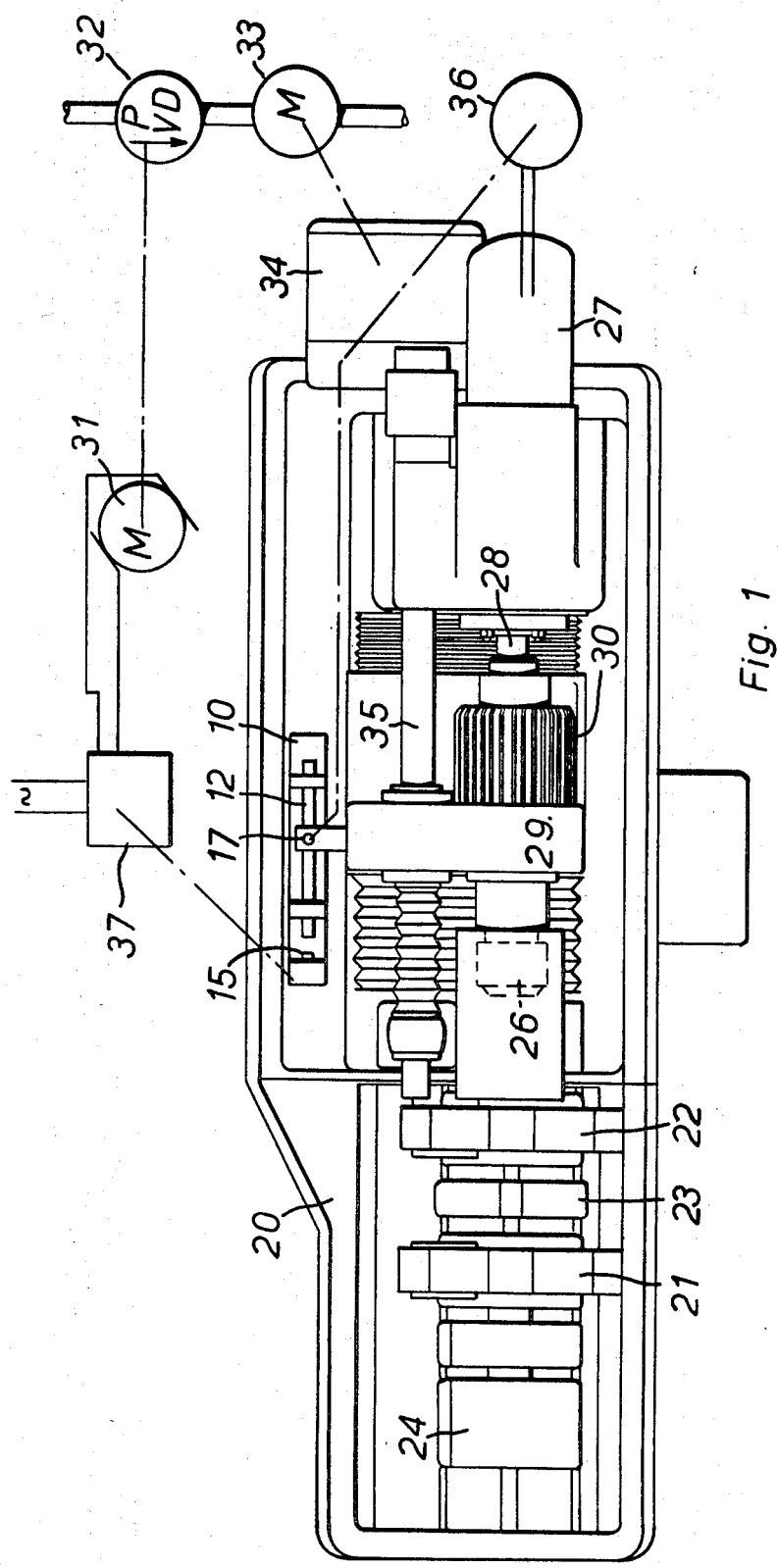

United States Patent [11] 3,549,076

| | | | | |
|---|---|---|---|---|
| [72] | Inventor | Lionel William Mills Kinghorn, Scotland | | |
| [21] | Appl. No. | 729,033 | | |
| [22] | Filed | May 14, 1968 | | |
| [45] | Patented | Dec. 22, 1970 | | |
| [73] | Assignee | Steelweld Limited Grantham, England a British company | | |
| [32] | Priority | May 16, 1967 | | |
| [33] | | Great Britain | | |
| [31] | | No. 22,679/67 | | |

[54] FRICTION WELDING APPARATUS WITH MICROMETER WELD CONTROL
12 Claims, 2 Drawing Figs.
[52] U.S. Cl. ..................................... 228/2, 29/470.3; 156/73; 228/9
[51] Int. Cl. ................................. B23k 27/00
[50] Field of Search .......................................... 228/2; 29/470.3; 33/164; 156/73

[56] References Cited
UNITED STATES PATENTS
| | | | |
|---|---|---|---|
| 2,549,332 | 4/1951 | Parker .......................... | 33/164X |
| 3,235,160 | 2/1966 | Walton .......................... | 228/2 |

Primary Examiner—John F. Campbell
Assistant Examiner—Robert J. Craig
Attorney—Larson, Taylor and Hinds ABSTRACT: In friction welders, the weld formation is accurately controlled so as to avoid insufficient "burnoff" and also to avoid excessive flash formation, the control being by a measuring device set by a micrometer. The device has a control member which is moved with the welding head as soon as the workpieces make contact and which stops movement of the welding head as soon as a desired "burnoff" movement of the welding head has occurred.

FRICTION WELDING APPARATUS WITH MICROMETER WELD CONTROL

DESCRIPTION

This invention comprises improvements in and relating to friction welding.

In friction welding, the parts to be joined are be brought into contact and relatively rotated in contact to generate by friction sufficient heat to raise the temperature of the parts to a value to enable welding to be achieved. When this condition is achieved rotation is stopped and forging pressure applied to complete the joint.

In practice, it is found that to obtain a good quality weld, relative rotation must continue until a certain amount of metal has been "burned off" the contacting parts. On the other hand, if rotation is continued too long, the amount of flash which is produced and have to be subsequently removed from the region of the welded joint is excessive.

This invention therefore provides control means by which the amount of burnoff can be accurately determined.

Accordingly the invention provides control apparatus including first means operable in use to produce a first signal indicating contact of the parts to be welded or commencement of friction welding, a measuring device which is automatically placed in operation by said signal, said device being responsive to extent of burnoff and producing a second signal indicating a predetermined extent of burnoff, and means responsive to the second signal to limit further burnoff.

The first means may take many forms and may be afforded by an existing part of the friction welding apparatus. For example, the first signal may be a pressure rise which occurs in thrust cylinders of the friction welding apparatus at the moment of contact between the parts to be welded. Or the signal may be derived by actuation of a mercury, or other acceleration-responsive, switch arranged to sense the deceleration which occurs at the moment of impact between the parts being welded. Or the signal may be derived by completion of an electric circuit due to the parts being welded coming into contact. Or the signal may be derived from photoelectric apparatus arranged to detect contact of the parts being welded or the existence of another characteristic condition in the welding process. Or the signal may be derived from the motor employed to rotate one of the parts being welded and may for instance be the peak demand of torque from the motor which peak demand occurs immediately after contact during the initial wear-in phase which occurs just prior to commencement of the burnoff process proper.

The second signal may be of any convenient kind and means responsive to the second signal may on operation cause switch off of the current supply to the motor, application of brakes to stop relative rotation of the parts being welded and application of forging pressure.

Figure 2:
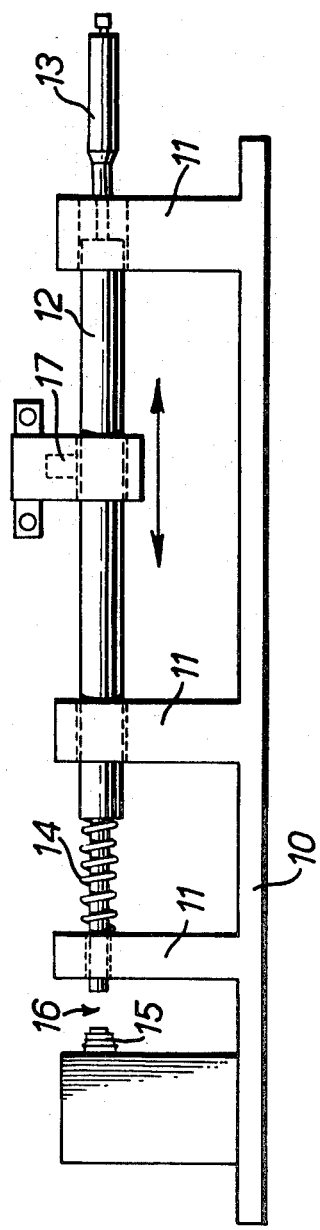

One embodiment of this invention will now be described by way of example with reference to the accompanying drawings in which:

FIG. 1 shows diagrammatically a friction welder with the control of this invention applied thereto, and FIG. 2 shows the control in more detail.

The friction welder has a bed 20 at one end of which is mounted a pair of rotary centering brackets 21, 22, a clamp 23 and a stationary thrust taking unit 24, by which parts one of two workpieces to be joined is supported during welding.

At the opposite end of the base, there is an hydraulic ram thrust assembly 27 whereof the piston rod 28 is connected to displace along the base a gear casing 29 carrying a rotatable chuck 26 for the workpiece which is to be friction welded to the workpiece held in the parts 21, 22, 23 and 24. The thrust of the ram 27 is transmitted through a thrust taking assembly 30 which moves with the gear casing 29.

The chuck 26 is rotatively driven by a drive arrangement shown to comprise an electric motor 31, a variable delivery hydraulic pump 32 driven by the motor 31, and hydraulic motor 33 which is actuated by the fluid delivered by pump 32, gearing driven by the hydraulic motor 33 and housed in casing 34 and having an output shaft of the gearing in casing 29. The shaft 35 will have a splined connection with the input gear member of the gearing in casing 29 to accommodate movement of the casing 29 relatively along the bed 20.

In operation, the workpieces to be welded are mounted in the assembly 21, 22, 23 and 24 and in chuck 26 respectively, the drive arrangement is started to drive the chuck 26, the ram of the thrust assembly 27 is operated to bring the workpieces into contact and gradually to feed the chuck forward during friction preheating and burnoff. During this period the contacting faces of the workpieces become molten or plastic and metal is radially-exuded. Next rotation of the chuck 26 is rapidly stopped and the ram pressure is simultaneously rapidly increased to effect the forging stage of the weld.

The resulting weld has a peripheral flash.

This invention provides a control whereby rotation of the chuck is stopped only after burnoff has been properly completed but before an excessive flash has been formed.

One form of such control is shown and it includes a simple form of measuring device (FIG. 2) which, as indicated in FIG. 1, can be readily added to an existing machine.

The device comprises a base 10 which will be secured on the machine bed 20 and which has a number of apertured lugs 11 fitted with bushes in which slides a rod 12. The rod 12 will be arranged to slide parallel to the moving head of the friction welding machine.

The rod 12 is loaded by a spring 14 to make contact at one end with a micrometer 13 which is mounted on the adjacent lug 11. A limit switch 15 is aligned with the opposite end of the rod 12. The micrometer 13 is adjustable to select the width of the gap 16 between the switch 15 and the adjacent end of the rod 12 when the rod is in contact with the micrometer anvil.

The measuring device also includes a clamp 17 which will be mounted on the moving parts of the friction welding machine. The clamp 17 is shown as mounted on the gear casing 29. The clamp 17 is capable of moving freely along the rod 12 and of being automatically clamped on the rod 12 to cause it to slide. The clamping operation is initiated by the first signal and so the rod does not commence to slide until the welding process has commenced.

Clearly this effect could not be achieved merely by attaching the rod to the moving head, because the extents of projection of the parts, which are to be welded, from their clamps will vary.

As burnoff proceeds, the rod 12 is moved with head until, after a travel determined by the width of the gap 16, the limit switch 15 is operated to give the second signal which initiates termination of burnoff. The extent of burnoff is thus accurately determined by the width of gap 16. By selecting the dimension to be the minimum extent of burnoff to ensure a good quality weld, it is possible to obtain good quality welds with the minimum of flash.

The clamp 17 can be actuated in any convenient way to grip the rod 12. For instance, the rod may be gripped by a solenoid-operated plunger or by pneumatically or hydraulically-operated piston, or by magnetic means.

In FIG. 1, the first signal is shown as being derived from the hydraulic ram thrust assembly 27 by for instance connecting a pressure transducer 36 to the assembly to produce an electrical signal which is used to actuate a solenoid for operating the clamp 17 when a predetermined pressure rise is sensed by the transducer.

The second signal is derived by actuation of the switch 15 by the rod 12, and this signal may be used as shown to actuate a control 37 to cut off the supply of electric current to the motor 31 and if desired to actuate a braking mechanism which assists positively to stop rotation of the chuck 26. This signal may also be used to vary the supply of pressure fluid to the hydraulic ram thrust assembly to increase the pressure applied by it to the workpieces to effect forging. The forging pressure is substantially greater than that used during burnoff.

In another construction, it is arranged that the movement in the measuring device is rotational rather than rectilineal as in the foregoing construction.

Clearly many other constructions of device are possible, it merely being essential to be able to select a value of variable, e.g. distance as in the above example, and to compare with it a value of the variable representing the extent of burnoff.

I claim:

1. Friction welding apparatus of the class comprising a machine bed, a pair of relatively rotatable work-holding chucks mounted on the machine bed, means for mounting said chucks on the machine bed for relative movement in the direction of the axis of rotation of said chucks, a motor for effecting the relative rotation of the chucks and a thrust assembly for providing the relative movement of the chucks in the direction of the axis of rotation, and control means for automatically controlling the motor and thrust assembly, said apparatus being characterized by the improvement wherein the control means controls burnoff and comprises first means, actuated responsive to contact of the work pieces held in the respective chucks upon movement of the relatively rotatable chucks towards one another in said direction, for producing a first signal indicative of said contact; a measuring device including a movable element of said means responsive to said first signal for connecting said movable element of said measuring device for movement with the chuck in said direction; second means responsive to movement of said movable element of said measuring device for producing a second signal; micrometer means settable to select the extent of movement of the movable element while connected for movement with the chucks to thereby predetermine the extent of burnoff; and means responsive to said second signal for effecting termination of burnoff.

2. Friction welding apparatus according to claim 1, the first signal being a pressure rise which occurs in thrust cylinders of the friction welding apparatus at the moment of contact between the parts to be welded.

3. Friction welding apparatus according to claim 1, the first signal being derived by actuation of an acceleration-responsive switch arranged to sense the deceleration which occurs at the moment of impact between the parts being welded.

4. Friction welding apparatus according to claim 1, the first signal being derived by completion of an electric circuit due to the parts being welded coming into contact.

5. Friction welding apparatus according to claim 1, the first signal being derived from photoelectric apparatus arranged to detect contact of the parts being welded.

6. Friction welding apparatus according to claim 1, the first signal being derived from the motor employed to rotate one of the parts being welded.

7. Friction welding apparatus according to claim 6, the first signal being the peak demand of torque from the motor which peak demand occurs immediately after contact during the initial wear-in phase which occurs just prior to commencement of the burnoff process proper.

8. Friction welding apparatus according to claim 1, wherein the means responsive to the second signal on operation causes switch off of the current supply to the motor, application of brakes to stop relative rotation of the parts being welded and application of forging pressure.

9. Friction welding apparatus according to claim 1, wherein the movable element of the measuring device comprises a slidable rod connectable to move with the chucks on occurrence of the first signal, and the micrometer means has an adjustable stop for one end of the rod, the stop being settable to determine the extent of movement of the rod with the chucks before it produces the second signal.

10. Friction welding apparatus according to claim 9, the second signal being produced by a limit switch after predetermined movement of the rod away from the stop.

11. Friction welding apparatus according to claim 9, the rod being connectable to the chucks of the apparatus by a clamp actuated by the first signal.

12. Friction welding apparatus according to claim 1, wherein said movable element comprises a slidable rod, said means responsive to said first signal comprises a clamp for connecting the rod to the chucks so that said rod partakes of the relative movement of the chucks in the the direction of said axis, said second means for producing the second signal comprises a limit switch actuated by the slidable rod, and said micrometer means includes a settable stop against which the rod is held until actuation of the clamp in response to the first signal.